United States Patent
Inogai (10) Patent No.: US 7,330,914 B2
(45) Date of Patent: Feb. 12, 2008

(54) DMA CONTROLLER, DMA CONTROL METHOD AND DMA CONTROL PROGRAM

(75) Inventor: Masato Inogai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 583 days.

(21) Appl. No.: 11/024,761

(22) Filed: Dec. 30, 2004

(65) Prior Publication Data
US 2005/0108446 A1    May 19, 2005

Related U.S. Application Data

(63) Continuation of application No. PCT/JP02/13384, filed on Dec. 20, 2002.

(51) Int. Cl.
*G06F 13/28* (2006.01)

(52) U.S. Cl. .......................... 710/22; 710/23; 710/24; 710/28

(58) Field of Classification Search .................. None
See application file for complete search history.

(56) References Cited

U.S. PATENT DOCUMENTS

| | | | |
|---|---|---|---|
| 5,111,425 A | 5/1992 | Takeuchi et al. | 395/425 |
| 5,313,607 A | 5/1994 | Tokumaru | 395/425 |
| 5,594,923 A | 1/1997 | Inoue et al. | 395/842 |

FOREIGN PATENT DOCUMENTS

| | | |
|---|---|---|
| EP | 1006451 | 6/2000 |
| JP | 59-226956 | 12/1984 |
| JP | 61-235959 | 10/1986 |
| JP | 62-98444 | 5/1987 |
| JP | 1-114952 | 5/1989 |
| JP | 2-287661 | 11/1990 |
| JP | 2-301851 | 12/1990 |
| JP | 3-228163 | 10/1991 |
| JP | 4-247540 | 9/1992 |
| JP | 5-233522 | 9/1993 |
| JP | 9-128324 | 5/1997 |

*Primary Examiner*—Alan S. Chen
(74) *Attorney, Agent, or Firm*—Staas & Halsey LLP (57) ABSTRACT

The present invention is a DMA controller that accesses a transfer source and a transfer destination of a DMA transfer via a bus, that chains a plurality of data segments in the transfer source according to an instruction by an external initiator, and that performs burst-transfer to the transfer destination, and when a boundary data, that is a remaining data after dividing in the bus width units and data less than the bus width, is generated, the boundary data is stored in a boundary data buffer in the DMA controller, the data to be read from the transfer source by the next DMA command and the previously stored boundary data are merged, and the data is burst-transferred to the transfer destination.

17 Claims, 8 Drawing Sheets

FIG. 2

FIG. 5(a)
TRANSFER SOURCE DATA SEGMENT

|       | 0   | 1   | 2   | 3   |
|-------|-----|-----|-----|-----|
| 0 x 0 | a00 | a01 | a02 | a03 |
| 0 x 4 | a10 | <u>a11</u> | <u>a12</u> | a13 |
| 0 x 8 | a20 | a21 | a22 | a23 |
| 0 x C | a30 | a31 | a32 | a33 |
| 0 x 10| a40 | a41 | a42 | a43 |
| 0 x 14| a50 | a51 | a52 | a53 |

FIG. 5(b)
TRANSFER SOURCE DATA SEGMENT

|       | 0   | 1   | 2   | 3   |
|-------|-----|-----|-----|-----|
| 0 x 0 | b00 | b01 | b02 | b03 |
| 0 x 4 | <u>b10</u> | <u>b11</u> | <u>b12</u> | <u>b13</u> |
| 0 x 8 | <u>b20</u> | <u>b21</u> | <u>b22</u> | <u>b23</u> |
| 0 x C | <u>b30</u> | <u>b31</u> | <u>b32</u> | <u>b33</u> |
| 0 x 10| b40 | b41 | b42 | b43 |
| 0 x 14| b50 | b51 | b52 | b53 |

FIG. 5(c)
TRANSFER SOURCE DATA SEGMENT

|       | 0   | 1   | 2   | 3   |
|-------|-----|-----|-----|-----|
| 0 x 0 | c00 | c01 | c02 | c03 |
| 0 x 4 | c10 | c11 | c12 | c13 |
| 0 x 8 | c20 | c21 | <u>c22</u> | <u>c23</u> |
| 0 x C | <u>c30</u> | <u>c31</u> | <u>c32</u> | <u>c33</u> |
| 0 x 10| c40 | c41 | c42 | c43 |
| 0 x 14| c50 | c51 | c52 | c53 |

FIG. 5(d)
BUFFER FOR BURST-TRANSFER

|       | 0   | 1   | 2   | 3   |
|-------|-----|-----|-----|-----|
| 0 x 0 | a11 | a12 | b10 | b11 |
| 0 x 4 | b12 | b13 | b20 | b21 |
| 0 x 8 | b22 | b23 | b30 | b31 |
| 0 x C | b32 | b33 | c22 | c23 |
| 0 x 10| c30 | c31 | c32 | c33 |

FIG. 6(a)

BUFFER FOR BURST-TRANSFER

FIG. 6(b)

TRANSFER DESTINATION MEMORY IMAGE

FIG. 6(c)

TRANSFER DESTINATION MEMORY IMAGE

DMA CONTROLLER, DMA CONTROL METHOD AND DMA CONTROL PROGRAM

This application is a continuation application, filed under 35 USC 111(a), of International Application PCT/JP02/13384, filed Dec. 20, 2002.

TECHNICAL FIELD

The present invention relates to a DMA controller, a DMA control method, and a DMA control program for controlling in a DMA (Direct Memory Access) transfer for directly performing a data transfer between memories and a data transfer between an I/O and a memory without passing through a CPU.

BACKGROUND ART

DMA transfer is known as a method of directly transferring data between a memory and another device not by way of a CPU. Generally a DMA transfer has the advantage in a large volume data transfer compared with a PIO (Programmed I/O) transfer by way of a CPU, since burst transfer is possible and the load applied to the CPU can be distributed. Also in order to support a format of creating one data packet by chaining a plurality of segments, such as the case of Ethernet, DMAC (Direct Memory Access Controller: DMA controller) for controlling DMA transfer generally has a chain mode for continuously transferring a plurality of data segments at the transfer source, in addition to a single transmission mode for transferring one data segment at the transfer source.

In this chain mode, it is effective if an arbitrary address is allowed to locate the data segment at the transfer source, in terms of flexibility of user programming.

However in DMAC, which is connected to a bus that has a 2-byte or more width, misalignment, that is a status in which the boundary of the burst transfer does not match the bus width, occurs if a plurality of data segments divided at an arbitrary address boundary in byte units are transferred in the chain mode. For example, let us assume the case when the I/O is an Ethernet network adapter. The packet to be transferred from the memory to the I/O is comprised of a plurality of parts, including a header section and a payload section. Generally these parts are often prepared in the work area of each individual memory, and it is necessary to reassemble the individually stored parts and to convert them into a packet format that the I/O can recognize. One means is using DMA transfer, but if an individual part is constructed in an arbitrary address, data in an address that is not aligned to the bus width cannot be burst-transferred.

Therefore a burst transfer which occupies the bus continuously and a partial transfer which transfers data less than the bus width must be combined. In this case, arbitration of the bus enters at the boundary of the transfer, so the bus utilization efficiency drops compared to the case of all data being burst-transferred.

Examples of a DMA control method for handling such a misalignment problem are Japanese Patent Application Laid-Open Nos. H5-67035, H9-146877 and 2000-132497. The method shown in Japanese Patent Application Laid-Open No. H5-67035 is not preferable in terms of load distribution on the CPU, since alignment is adjusted by CPU control. Japanese Patent Application Laid-Open Nos. H9-146877 and 2000-132497 do not refer to transfer in the chain mode, therefore a drop in bus overhead when misalignment occurs in the chain mode is inevitable.

Also when the transfer destination memory, which is the destination of data transfer, is cache-controlled, an unnecessary cache control operation may be generated if burst-transfer is performed at an arbitrary address boundary for each received packet.

To solve these problems, it is an object of the present invention to provide a DMA controller, DMA control method and DMA control program to avoid dropping bus utilization efficiency when data segments, divided at arbitrary address boundaries in byte units, are DMA-transferred in the chain mode.

DISCLOSURE OF THE INVENTION

The present invention is a DMA controller that accesses a transfer source and a transfer destination of a DMA transfer via a bus, chaining a plurality of data segments in the transfer source according to an instruction by an external initiator, and performing burst-transfer to the transfer destination, comprising: a bus read section that reads the data segments of the transfer source as a first data; a buffer for burst-transfer for storing the data in bus width units; a boundary data buffer for storing the boundary data and the transfer destination address offset of the next data segment when a boundary data, that is a remaining data after dividing in the bus width units and is data less than the bus width, is generated; an accumulator for calculating a shift amount of the first data based on a transfer source address offset acquired by an instruction of the initiator and a transfer destination address offset stored in the boundary data buffer; a data shift section for shifting the first data according to the shift amount, merging the boundary data generated in the previous data segment and the shifted first data to generate a second data, and outputting the boundary data and the transfer destination address offset of the next data segment to the boundary data buffer, and outputting the data before the boundary data, out of the second data, to the buffer for burst-transfer when the boundary data is generated in the second data and the next data segment is chained; and a bus write section for burst-transferring the data stored in the buffer for burst-transfer to the transfer destination.

The data shift section outputs the second data to the buffer for burst-transfer except for the case when the boundary data is generated in the second data and the next data segment is chained.

Figure 1:
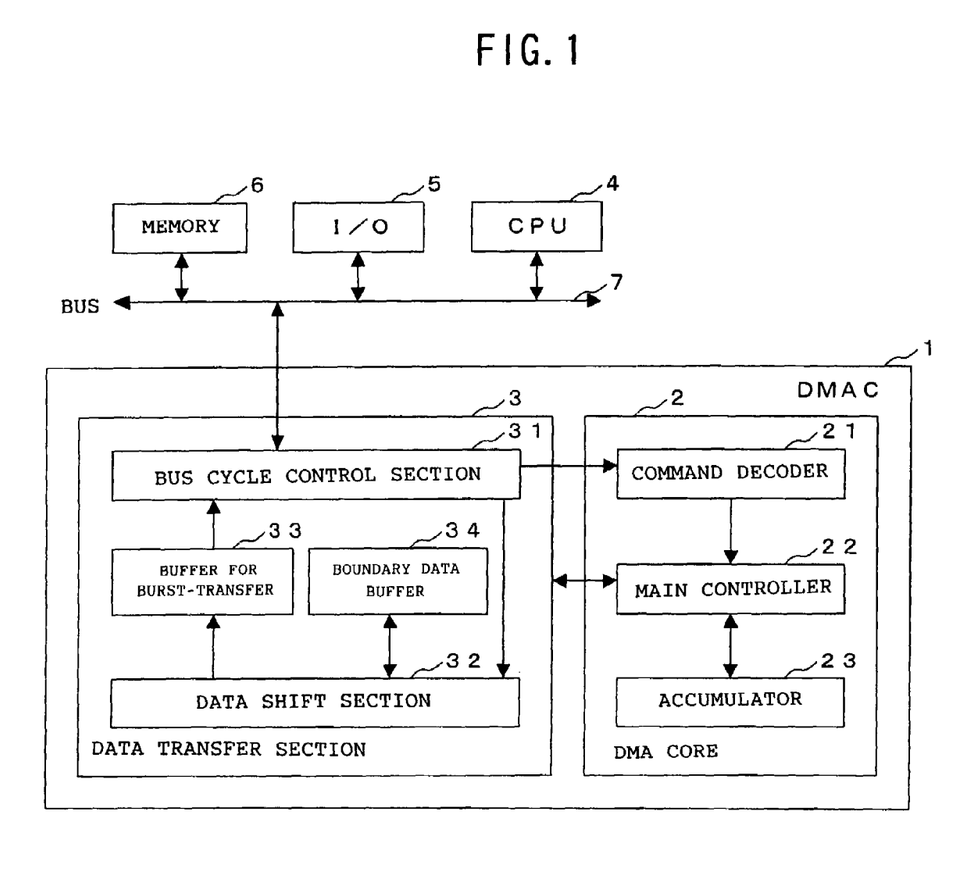
FIG. 1 is a block diagram depicting an example of a configuration of DMAC according to Embodiment 1.

According to this configuration, the utilization efficiency of the bus can be increased by reassembling the data so as to perform burst-transfer as much as possible when the data segments, divided at an arbitrary address boundary in byte units, are DMA-transferred in the chain mode. The bus read section and the bus write section in Embodiment 1 refer to the bus cycle control section 31.

The present invention is also a DMA controller that accesses a transfer source and transfer destination of a DMA transfer connected to a plurality of buses with different widths, chaining a plurality of data segments in the transfer source according to an external initiator, and performing burst-transfer to the transfer destination, comprising: a bus read section that reads the data segments of a transfer source as a first data; a buffer for burst-transfer for storing the data in the transfer destination bus width units; a boundary data buffer for storing the boundary data and the transfer destination address offset of the next data segment when a boundary data, that is a remaining data after dividing in the transfer source bus width units and is data less than the transfer source bus width, is generated; an accumulator for calculating a shift amount of the first data based on a transfer source address offset acquired by an instruction of the initiator and a transfer destination address offset stored in the boundary data buffer; a data reconstruction section for rearranging the data in the transfer source bus width units into the data in the transfer destination bus width units, and outputting the data to the buffer for burst-transfer; a data shift section for shifting the first data according to the shift amount, merging the boundary data generated in the previous data segment and the shifted first data to generate a second data, and outputting the boundary data and the transfer destination address offset of the next data segment to the boundary data buffer, and outputting the data before the boundary data out of the second data to be data reconstruction section when the boundary data is generated in the second data and the next data segment is chained; and a bus write section for burst-transferring the data stored in the buffer for burst-transfer to the transfer destination.

The data shift section outputs the second data to the data reconstruction section except for the case when the boundary data is generated in the second data and the next data segment is chained.

Figure 7:
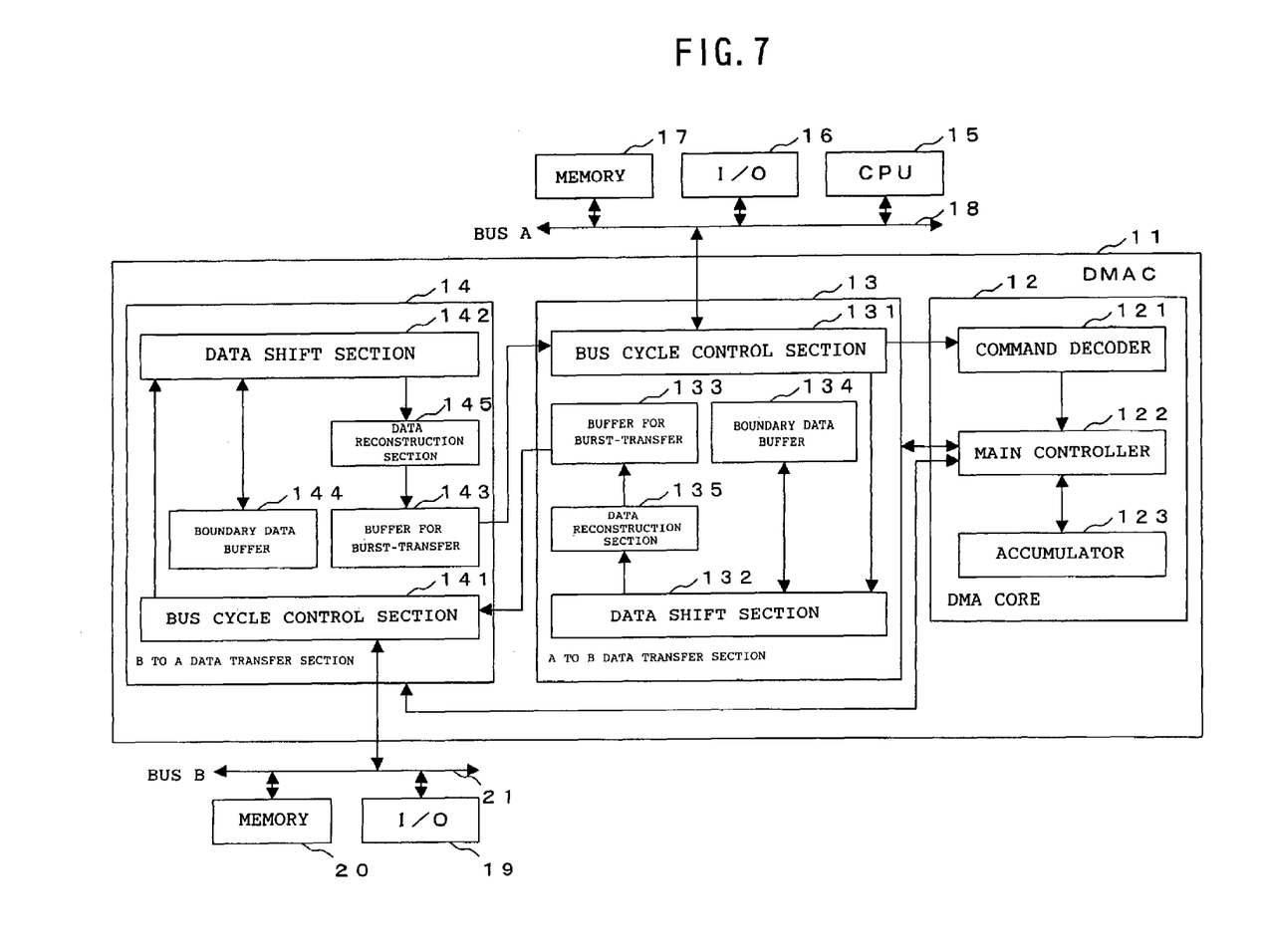
FIG. 7 is a block diagram depicting an example of a configuration of DMAC according to Embodiment 2.

According to this configuration, the utilization efficiency of the bus can be increased by reassembling data so as to perform burst-transfer as much as possible when the data segments divided at an arbitrary address boundary in byte units are DMA-transferred to the transfer destination which has a bus width different from that of the transfer source in the chain mode. The bus read section and the bus write section in Embodiment 2 refer to the bus cycle control sections 131 and 141.

In the DMA controller according to the present invention, when the transfer destination bus width is an integral multiple of the transfer source bus width, the data reconstruction section combines the data output from the data shift section and outputs it to the buffer for burst-transfer, and when the transfer source bus width is an integral multiple of the transfer destination bus width, the data reconstruction section divides the data output from the data shift section and outputs it to the buffer for burst-transfer.

According to this configuration, the utilization efficiency of the bus can be increased by reassembling data so as to perform burst-transfer as much as possible when the transfer destination bus width is an integral multiple of the transfer source bus width, or the transfer source bus width is an integral multiple of the transfer destination bus width.

In the DMA controller according to the present invention, when the transfer destination is cache-controlled, the accumulator calculates a burst-transfer size according to the boundary of the cache line, and the bus write section burst-transfers the data stored in the buffer for burst-transfer to the transfer destination according to the burst-transfer size.

According to this configuration, when the transfer destination memory is cache-controlled, the load of the cache control section, outside the DMAC, can be decreased by performing burst-transfer according to the cache line boundary of the transfer destination memory.

In the DMA controller according to the present invention, when there is a plurality of external initiators, the boundary data buffer stores a same number of sets of boundary data and the transfer destination address offset of the next data segment as the number of the initiators, and the accumulator calculates the shift amount of the data segment based on the transfer source address offset and the transfer destination address offset for each instructed initiator.

According to this configuration, a DMA transfer instruction, by a plurality of initiators, can be supported.

The present invention is also a DMA control method that accesses a transfer source and a transfer destination of a DMA transfer via a bus, chaining a plurality of data segments in the transfer source according to an instruction by an external initiator, and performing burst-transfer to the transfer destination, comprising steps of: reading the data segments of a transfer source as a first data; calculating a shift amount of the first data based on a transfer source address offset acquired by an instruction of the initiator and a transfer destination address offset in the case when a boundary data, that is a remaining data after dividing the previous segment in the bus width units and is data less than the bus width, is generated; shifting the first data according to the shift amount, merging the boundary data generated in the previous data segment and the shifted first data to generate a second data, and storing the boundary data and the transfer destination address offset of the next data segment, and storing the data before the boundary data out of the second data as data for burst-transfer when the boundary data is generated in the second data and the next data segment is chained; and burst-transferring the data for burst-transfer to the transfer destination.

Except for the case when the boundary data is generated in the second data and the next data segment is chained, the DMA control method further comprises a step of storing the second data segment as the data for burst-transfer.

According to this configuration, the utilization efficiency of the bus can be increased by reassembling data so as to perform burst-transfer as much as possible when the data segments divided at an arbitrary address boundary in byte units are DMA-transferred in the chain mode.

The present invention is also a DMA control method that accesses a transfer source and a transfer destination of the DMA transfer connected to a plurality of buses with different widths, chaining a plurality of data segments in the transfer source according to an external initiator, and performing burst-transfer to a transfer destination, comprising steps of: reading the data segments of a transfer source as a first data; calculating a shift amount of the first data based on a transfer source address offset acquired by an instruction of the initiator and a transfer destination address offset in the case when a boundary data, that is a remaining data after dividing the previous data segment in the transfer source bus width units and is data less than the transfer source bus width, is generated; shifting the first data according to the shift amount, merging the boundary data generated in the previous data segment and the shifted first data to generate a second data, and storing the boundary data and the transfer destination address offset of the next data segment and rearranging the data before the boundary data out of the second data into the data in the transfer destination bus width units, and storing the data as the data for burst-transfer when the boundary data is generated in the second data and the next data segment is chained; and burst-transferring the data for burst-transfer to the transfer destination. Except for the case when the boundary data is generated in the second data and the next data segment is chained, the DMA control method further comprises a step of rearranging the second data into the data in the transfer destination bus width units and storing the data as the data for burst-transfer.

According to this configuration, the utilization efficiency of the bus can be increased by reassembling the data so as to perform burst-transfer as much as possible when the data segments divided at an arbitrary address boundary in byte units are DMA-transferred to a transfer destination having a different bus width from the transfer source in the chain mode.

The present invention is also a DMA control program stored in a medium readable by a computer for a computer to execute the operation of accessing a transfer source and a transfer destination of a DMA transfer via a bus, chaining a plurality of data segments in the transfer source according to an instruction by an external initiator, and performing burst-transfer to the transfer destination, comprising steps of: reading the data segments of a transfer source as a first data; calculating a shift amount of the first data based on a transfer source address offset acquired by an instruction of the initiator and a transfer destination address offset in the case when a boundary data, that is a remaining data after dividing the previous data segment in the bus width units and is data less than the bus width, is generated; shifting the first data according to the shift amount, merging the boundary data generated in the previous data segment and the shifted first data to generate a second data, and storing the boundary data and the transfer destination address offset of the next data segment and storing the data before the boundary data out of the second data as data for burst-transfer when the boundary data is generated in the second data and the next data segment is chained; and burst-transferring the data for burst-transfer to the transfer destination.

Except for the case when the boundary data is generated in the second data and the next data segment is chained, the DMA control program further comprises a step of storing the second data segment as data for burst-transfer.

According to this configuration, the utilization efficiency of the bus can be increased by reassembling the data so as to perform burst-transfer as much as possible when the data segments divided at an arbitrary address boundary in byte units are DMA-transferred in the chain mode.

The present invention is also a DMA control program stored in a medium readable by a computer for the computer to execute the operation of accessing a transfer source and a transfer destination of a DMA transfer connected to a plurality of buses with different widths, chaining a plurality of data segments in the transfer source according to an external initiator, and performing burst-transfer to the transfer destination, the program causing the computer to execute steps of: reading the data segments of a transfer source as a first data; calculating a shift amount of the first data based on a transfer source address offset acquired by an instruction of the initiator and a transfer destination address offset in the case when a boundary data, that is a remaining data after dividing the previous data segment in the transfer source bus width units and is data less than the transfer source bus width, is generated; shifting the first data according to the shift amount, merging the boundary data generated in the previous data segment and the shifted first data to generate a second data, and storing the boundary data and the transfer destination address offset of the next data segment, and rearranging the data before the boundary data out of the second data into the data in the transfer destination bus width units and storing the data as the data for burst-transfer when the boundary data is generated in the second data and the next data segment is chained; and burst-transferring the data for burst-transfer to the transfer destination.

Except for the case when the boundary data is generated in the second data and the next data segment is chained, the DMA control program further comprises a step of rearranging the second data into data in the transfer destination bus width units and storing the data as the data for burst-transfer.

According to this configuration, the utilization efficiency of the bus can be increased by reassembling the data so as to perform burst-transfer as much as possible when the data segments divided at an arbitrary address boundary in byte units are DMA-transferred to the transfer destination having a different bus width from the transfer source in the chain mode.

BRIEF DESCRIPTION OF THE DRAWINGS

FIG. 5(*a*)-5(*d*) are diagrams depicting an example of the operation of storing the data read from the transfer source by a three-time DMA command to the buffer for burst-transfer;

FIG. 6(*a*)-6(*c*) are diagrams depicting an example of the operation of performing burst-transfer using a burst-transfer size matching the boundary of the cache line;

BEST MODE FOR CARRYING OUT THE INVENTION

Embodiments of the present invention will now be described with reference to the drawings.

Embodiment 1

In this embodiment, the operation of DMAC when the transfer source bus and the transfer destination bus of the DMA transfer target are common. Here it is assumed that DMA transfer is performed in the chain mode. In the present invention, the bus format, such as a method of using an address/data/control signal, is not restricted. FIG. 1 is a block diagram depicting an example of a configuration of DMAC according to Embodiment 1. A DMAC 1, CPU 4, I/O 5 and memory 6 are connected via a bus 7 which has a bus width of two-bytes or more. In this case, the CPU 4 is an initiator of the DMAC 1, and the I/O 5 and the memory 6 are the DMA transfer targets that can be a transfer source or a transfer destination in the DMA transfer.

As FIG. 1 shows, the DMAC 1 according to the present embodiment comprises a DMA core 2 and data transfer section 3. The DMA core 2 is comprised of a command decoder 21, main controller 22 and accumulator 23. The data transfer section 3 is comprised of a bus cycle control section 31, data shift section 32, buffer for burst-transfer 33 and boundary data buffer 34.

Figure 2:
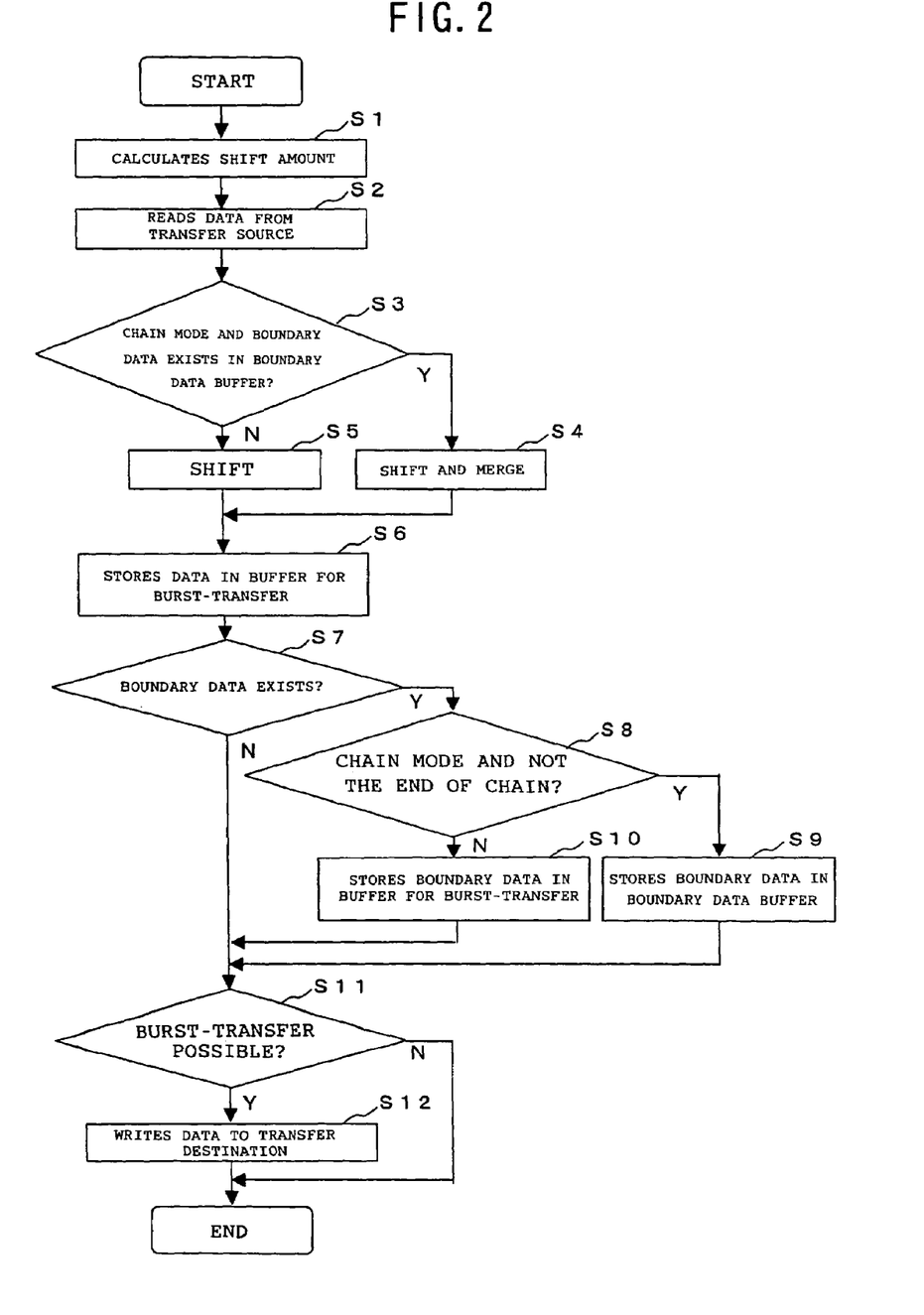
FIG. 2 is a flow chart depicting an example of the operation of DMAC according to Embodiment 1.

Now an operation of the DMAC 1 according to the present embodiment will be described. FIG. 2 is a flow chart depicting an example of the operation of DMAC according to Embodiment 1. First this flow is started by the CPU 4 notifying the DMA command to the DMAC 1. One DMA command is notified to the DMAC for transferring one data segment in the transfer source. In the chain mode, a plurality of DMAC commands are notified to the DMAC. The DMA command is comprised of a transfer source address, transfer destination address, transfer size and chain flag. The chain flag is a flag to indicate whether the data segments indicated by a plurality of DMA commands are chained and transferred or not, and if the chain flag exists, it means that the data is chained with the data transferred in the previous chain mode, and if the chain flag does not exist, the data is transferred independently from the previous transfer.

The chain flag is also a flag for indicating whether the data segment is the end of the chain or not. Generally DMA command notification methods include a method of the CPU notifying the DMA start command to the DMAC by PIO via a common bus, and a method of the CPU preparing a series of DMA commands in a common memory area in advance, and notifying only the start trigger to DMAC, and any of these methods can be used.

The DMA command transmitted from the CPU 4 is received by the bus cycle control section 31 via the bus 7, and is input to the command decoder 21. Here the bus cycle control section 31 performs transmission/reception according to bus protocol.

Then the command decoder 21 interprets the DMA command and outputs an instruction on the DMA acquired as the result to the main controller 22. The main controller 22 provides the transfer source address offset and the transfer destination address offset to the accumulator 23. The accumulator 23 calculates the shift amount to be provided to the data shift section 32 based on the transfer source address offset and the transfer destination address offset, and outputs it to the main controller 22 (S1).

If the chain flag exists here, the main controller 22 reads the address offset stored in the boundary data buffer, and provides the address offset to the accumulator 23 as the transfer destination address offset. The boundary data buffer 34 stores the boundary data, which is a remaining data after dividing the previous data segment in the bus width units and is data less than the bus width, and the transfer destination address offset which is generated by the boundary data.

Then the main controller 22 instructs the bus cycle control section 31 to read the data from the transfer source. The bus cycle control section 31 reads the data from the transfer source, and outputs it to the data shift section 32 (S2).

Then the main controller 22 judges whether it is the chain mode and whether the boundary data exists in the boundary data buffer 34 or not (S3).

If it is chain mode and if the boundary data exists in the boundary data buffer (S3, Y), the data shift section 32 shifts the data read from the transfer source according to the shift amount provided by the main controller 22, then merges the boundary data and the shifted data (S4), and outputs the data to the buffer for burst-transfer 33 in the bus width units (S6). The buffer for burst-transfer 33 stores the input data in the bus width units.

Except for the above case (S3, N), the data shift section 32 shifts the data read from the transfer source according to the shift amount provided by the main controller 22 (S5), and outputs the shifted-data to the buffer for burst-transfer in the bus width units (S6). The buffer for burst-transfer 33 stores the input data in the bus width units.

The main controller 22 judges whether the boundary data remained when the data was stored in the bus width units (S7). If the boundary data did not remain (S7, N), processing moves to S11. If the boundary data remained (S7, Y), the main controller 22 judges whether it is chain mode and that the data is not the end of the chain (S8).

If it is chain mode and the data is not the end of the chain (S8, Y), the data shift section 32 stores the boundary data and the transfer destination address offset of the next data segment to the boundary data buffer 34 (S9), and processing moves to S11.

Except for the above case (chain flag does not exist, or the data is the end of the chain) (S8, N), the data shift section 32 stores the boundary data to the buffer for burst-transfer 33 (S10), and processing moves to S11.

Then the main controller 22 judges whether the burst-transfer of the data stored in the buffer for burst-transfer 33 is possible (S11). Whether the burst-transfer to the transfer destination bus is started is determined according to the operating status of the transfer destination bus, where transfer starts if the bus access right can be obtained, and if in busy status, the start of burst-transfer to the transfer destination bus may be delayed, or data to be transferred by the next DMA command may be added during the delay. If burst-transfer is impossible (S11, N), this flow ends. If burst-transfer is possible (S11, Y), the main controller 22 instructs the bus cycle control section 31 to write the data to the transfer destination. The bus cycle control section 31 writes the data to the transfer destination by burst-transferring the data stored in the buffer for burst-transfer 33 to the transfer destination via the bus 7 (S12), and this flow ends. This flow is repeatedly executed as long as the chain continues.

Figure 3:
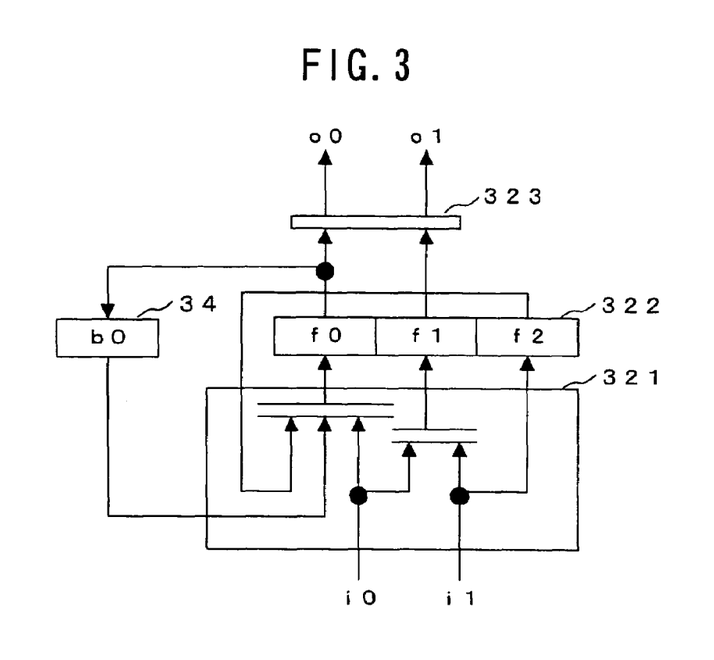
FIG. 3 is a block diagram depicting an example of a configuration of the data shift section and the boundary data buffer when the bus width is two-bytes.

Now the configuration of the data shift section 32 and the boundary data buffer 34 will be described. FIG. 3 is a block diagram depicting an example of the configuration of the data shift section and the boundary data buffer when the bus width is two-bytes. As FIG. 3 shows, the data shift section 32 is comprised of a data select section 321, shift buffer 322 and gate 323. The sizes of the boundary data buffer 34 and the shift buffer 322 are determined by the bus width. In this example, it is assumed that the size of the boundary data buffer 34 is one-byte and the size of the shift buffer 322 is three-bytes. In FIG. 3, i0 and i1 indicate each byte of the input data, and o0 and o1 indicate each byte of the output data. In this case, the input data is the data read from the transfer source which is input in the bus width units, and the output data is data to be stored to the buffer for burst-transfer 33. f0, f1 and f2 indicate each byte of the shift buffer 322, and b0 indicates a byte of the boundary data buffer 34. All data is in byte units.

Figure 4:
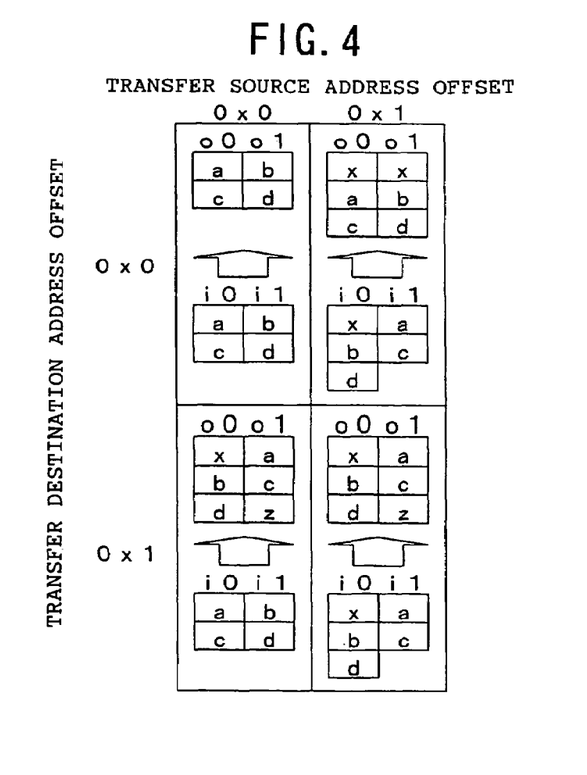
FIG. 4 is a diagram depicting an example of input/output data of the data shift section when the bus width of the transfer source is two-bytes and the bus width of the transfer destination is two-bytes.

Now the operation of the data shift section 32 and the boundary data buffer 34 will be described using specific examples. FIG. 4 is a diagram depicting an example of the input/output data of the data shift section when the bus width of the transfer source is two-bytes, and the bus width of the transfer destination is two-bytes. In FIG. 4, the numeric value above the column indicates the transfer source address offset for the case when in the corresponding column, and the numeric value at the left of the row indicates the transfer destination address offset for the case shown in the corresponding row. One cell in FIG. 4 indicates a case of having a transfer source address offset that corresponds to a column and a transfer destination address offset that corresponds to a row, the content of a cell is indicated by the input data i0 and i1 and the output data o0 and o1 in each case. x is a data read from the transfer source by the previous DMA command in the chain mode, and a, b, c and d are data to be read from the transfer source by the current DMA command in the chain mode, and if the chain continues, z is the next data to be read from the transfer source by the next DMA command in the chain mode, and if the chain does not continue, z does not exist. The two-byte input data i0 and i1 is shifted by the data shift section 32, is merged with the boundary data if necessary, then is output to the buffer for burst-control 33 as two-byte output data o0 and o1.

First the case when the transfer source address offset of the data segment to be read from the transfer source is 0×0 and the transfer destination address offset thereof is 0×0 will be described. Initially the data select section 321 outputs the first input data a (i0) to the shift buffer f0, and outputs the first input data b (i1) to the shift buffer f1. The shift buffer 322 outputs the data a which was input to f0 to the gate 323 and also to the boundary data buffer b0, and the data b which was input to f1 to the gate 323. The gate outputs the data a as the output data o0 and data b as the output data o1 to the buffer for burst-transfer 33.

Then the data select section 321 outputs the next input data c (i0) to the shift buffer f0, and outputs the next input data d (i1) to the shift buffer f1. The shift buffer 322 outputs the data c, which was input to f0, to the gate 323, and also outputs it to the boundary data buffer b0, and outputs the data d, which was input to f1, to the gate 323. The gate outputs the data c as the output data o0 and the data d as the output data o1 to the buffer for burst-transfer 33.

Now the case when the transfer source address offset of the data segment read from the transfer source is 0×1 and the transfer destination address offset is 0×0 will be described. First the data select section 321 outputs the first input data a (i1) to the shift buffer f2. The shift buffer 322 outputs the data a which was input to f2 to the data select section 321.

Then the data select section 321 outputs the data a to the shift buffer f0 and the next input data b (i0) to the shift buffer f1, and the next input data c (i1) to the shift buffer f2. The shift buffer 322 outputs the data a which was input to f0 to the gate 323, and also to the boundary data buffer b0, outputs the data b which was input to f1 to the gate 323, and outputs the data c which was input to f2 to the data select section 321. The gate 323 outputs the data a as the output data o0 and the data b as the output data o1 to the buffer for burst-transfer 33. In other words, the data a and b are shifted by the data shift section 32 according to the shift amount provided by the main controller 22, and output to the buffer for burst-transfer 33.

Then the data select section 321 outputs the data c to the shift buffer f0 and outputs the next input data d (i0) to the shift buffer f1. The shift buffer 322 outputs the data c which was input to f0 to the gate 323, and also to the boundary data buffer b0, and outputs the data d which was input to f1 to the gate 323. The gate outputs the data c as the output data o0 and data d as the output data o1 to the buffer for burst-transfer 33.

Now the case when the transfer source address offset of the data segment read from the transfer source is 1×0, and the transfer destination address offset is 0×1 will be described. First the data select section 321 outputs the data x stored in the boundary data buffer b0 to the shift buffer f0, outputs the first input data a (i0) to the shift buffer f1, and outputs the first input data b (i1) to the shift buffer f2. In this case the data x is a boundary data generated in the previous data segment. The shift buffer 322 outputs the data x which was input to f0 to the gate 323, and also to the boundary data buffer b0, outputs the data a which was input to f1 to the gate 323, and outputs the data b which was input to f2 to the data select section 321. The gate outputs the data x as the output data o0 and the data a as the output data o1 to the buffer for burst-transfer 33. In other words, the data a is shifted by the data shift section 32 according to the shift amount provided from the main controller 22, then is merged with the boundary data x and is output to the buffer for burst-transfer 33.

Then the data select section 321 outputs the data b to the shift buffer f0, outputs the next input data c (i0) to the shift buffer f1 and the next input data d (i1) to the shift buffer f2. The shift buffer 322 outputs the data b which was input to f0 to the gate 323, and also to the boundary data buffer b0, outputs the data which was input to f1 to the gate 323, and outputs the data d which was input to f2 to the date select section 321. The gate 323 outputs the data b as the output data o0, and the data c as the output data o1 to the buffer for burst-transfer 33.

Then the data select section 321 outputs the data d to the shift buffer f0. The shift buffer 322 outputs the data d which was input to f0 to the gate 323, and also to the boundary data buffer b0. If the chain continues here, then the gate 323 does not output the data d, and the data d is held in the boundary data buffer b0, is merged with the data z to be read from the transfer source in the next data segment, and the merged data is output to the buffer for burst-transfer 33. If the chain does not continue, the gate 323 outputs the data d to the buffer for burst-transfer 33. Now the case when the transfer source address offset of the data segment to be read from the transfer source is 0×1 and the transfer destination address offset thereof is 0×1 will be described. First the data select section 321 outputs the data x held in the boundary data buffer b0 to the shift buffer f0, and outputs the first input data a (i1) to the shift buffer f1. In this case the data x is a boundary data generated in the previous data segment. The shift buffer 322 outputs the data x which was input to f0 to the gate 323 and also to the boundary data buffer b0, and outputs the data a which was input to f1 to the gate 323. The gate 323 outputs the data x as the output data o0, and data a as the output data o1 to the buffer for burst-transfer 33. In other words, the data a is merged with the boundary data x by the data shift section 32, and the merged data is output to the buffer for burst-transfer 33.

Then the data select section 321 outputs the next input data b (i0) to the shift buffer f0 and outputs the next input data c (i1) to the shift buffer f1. The shift buffer 322 outputs the data b which was input to f0 to the gate 323 and also to the boundary data buffer b0, and outputs the data c which was input to f1 to the gate 323. The gate 323 outputs the data b as the output data o0, and the data c as the output data o1 to the buffer for burst-transfer 33.

Then the data select section 321 outputs the data d to the shift buffer f0. The shift buffer 322 outputs the data d which was input to f0 to the gate 323, and also to the boundary data buffer b0. If the chain continues here, the gate 323 does not output the data d, and the data d is held by the boundary data buffer b0, is merged with the data z to be read from the transfer source in the next data segment, and is output to the buffer for burst-transfer 33. If the chain does not continue, the gate 323 outputs the data d to the buffer for burst-transfer 33. In this way, the data read from the transfer source is shifted according to the shift amount provided by the main controller 22, and is merged and output to the buffer for burst-transfer 33 if the boundary data was generated in the previous data segment.

Now the operation of chaining the data segments divided at arbitrary address boundaries in byte units and creating data packets with continuous addresses will be described. FIG. 5 is a diagram depicting an example of the operation of storing the data read from the transfer source to the buffer for burst-transfer.

Figure 5A:
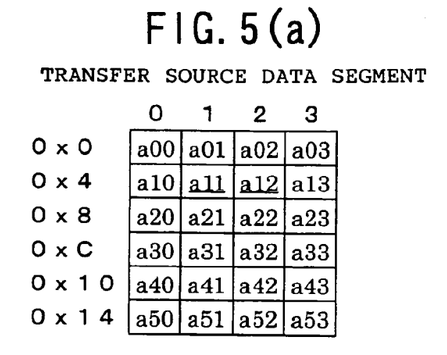
Figure 5B:
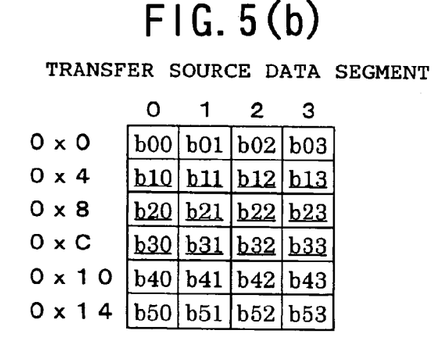
Figure 5C:
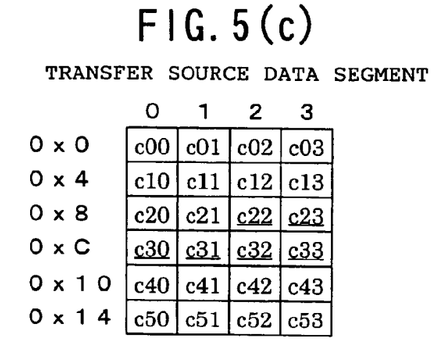
Figure 5D:
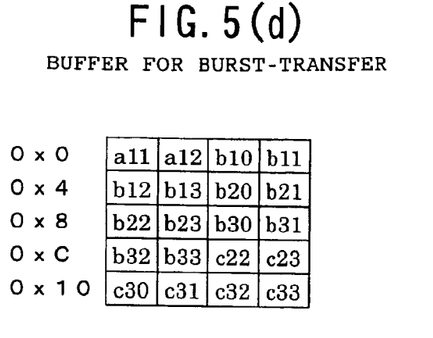

FIG. 5(a) shows the transfer source data segments, including the data read by the first DMA command, FIG. 5(b) shows the transfer source data segments, including the data read by the second DMA command, and FIG. 5(c) shows the transfer source data segments, including the data read by the third DMA command. In FIGS. 5(a)-(c), a row indicates the word address and a column indicates the transfer source bus width. FIG. 5(d) shows the buffer for burst-transfer, where the data read by the three-time DMA commands is stored. In FIG. 5(d), a row indicates the entry and a column indicates the transfer destination bus width.

In this case it is assumed that the bus width of the transfer source and the transfer destination is four-bytes, and a DMA command is started up three times. In the first DMA command, it is assumed that a chain flag exists, the transfer size is two-bytes, the transfer source address offset is 0×1 and the transfer destination address offset is 0×0. In the second DMA command, it is assumed that a chain flag exists, the transfer size is twelve-bytes, the transfer source address offset is 0×0 and the transfer destination address offset is 0×2. In the third DMA command, it is assumed that a chain flag does not exist, the transfer size is six-bytes, the transfer source address offset is 0×2 and the transfer destination address offset is 0×2.

First the case when the first DMA command is received will be described. Initially the data shift section 32 reads one-word data (a10-a13) from the transfer source, and stores two-byte data (a11, a12) when one-byte is shifted to the left according to the shift amount in the boundary data buffer 34. At this time the extra data a10 and 13 are discarded.

Now the case when the second DMA command is received will be described. First the data shift section 32 burst-reads three-word data (b10-b33) from the transfer source. When the first word (b10, b11, b12, the data shift section 32 merges the first word after shifting two-bytes to the right according to the shift amount with the data (a11, a12) stored in the boundary data buffer 34 by the first DMA command, then stores the merged-data to the entry 0×0 in the buffer for burst-transfer 33. Data which was not stored in the buffer for burst-transfer 33 (b12, b13) out of the first word remains in the data shift section 32 at a location after shifting two-bytes to the right.

Then when the second word (b20, b21, b22, b23) is read, the data shift section 32 merges the second word after shifting two-bytes to the right according to the shift amount with the remaining data (b12, b13), then stores the merged-data to the entry 0×4 of the buffer for burst-transfer 33. Data (b22, b23) which was not stored in the buffer for burst-transfer 33 out of the second word remains in the data shift section 32 at a location after shifting two-bytes to the right.

Then when the third word (b30, b31, b32, b33) is read, the data shift section 32 merges the third word after shifting two-bytes to the right according to the shift amount with the remaining data (b22, b23), then stores the merged-data to the entry 0×8 of the buffer for burst-transfer 33. Data (b32, b33) which was not stored in the buffer for burst-transfer 33 out of the third word is stored in the boundary data buffer 34.

At this point the data in the entry 0×0-0×8 of the buffer for burst-transfer 33 are enabled, so this three-word data can be burst-transferred to the transfer destination bus.

Now the case when the third DMA command is received will be described. First the data shift section 32 burst-reads the two-word data (c20-c33) from the transfer source bus. When the first word (c20, c21, c22, c23) is read, the data shift section 32 merges the first word after shifting zero-bytes according to the shift amount with the data (b32, b33) stored in the boundary data buffer 34 by the second DMA command, then stores the merged-data to the entry 0×C of the buffer for burst-transfer 33. At this time extra data c20 and c21 are discarded.

Then when the second word (c30, c31, c32, c33) is read, the data shift section 32 stores the second word after shifting zero-bytes according to the shift amount to the entry 0×10 of the buffer for burst-transfer 33.

At this point the data in the entry 0×C-0×10 in the buffer for burst-transfer 33 is enabled, so this two-word data can be burst-transferred to the transfer destination bus.

In the case of transfer by a conventional DMAC, for example, the above operation is divided into a four-time partial write, once a word write and once a two-word burst-write. Now the operation of outputting the data segments divided at an arbitrary address boundaries in byte unites to the transfer destination bus using a conventional DMAC will be described. Just like the above example, it is assumed that the bus width of the transfer source bus and the transfer destination bus is four-bytes, and a DMA command is started up three times.

First the case when the first DMA command is received will be described. The data shift section 32 reads one-word data (a10-a13) from the transfer source. The data shift section 32 partial-writes the two-byte data (a11, a12) after shifting one-byte to the left according to the shift amount to the transfer destination bus.

Now the case when the second DMA command is received will be described. The data shift section 32 burst-reads the three-word data (b10-b33) from the transfer source bus. When the first word (b10, b11, b12, b13) is read, the data shift section 32 partial-writes the two-byte data (b10, b11) out of the first word after shifting two-bytes to the right according to the shift amount to the transfer destination bus. Data (b12, b13) which was not partial-written out of the first word remains in the data shift section 32 at a location after shifting two-bytes to the right.

Then when the second word (b20, b21, b22, b23) is read, the data shift section 32 merges the second word after shifting two-bytes to the right according to the shift amount with the data (b12, b13) remaining in the data shift section 32, then stores the merged-data to the entry 0×4 of the buffer for burst-transfer 34. Data (b22, b23) which was not stored in the buffer for burst-transfer 34 out of the second word remains in the data shift section 32 at a location after shifting two-bytes to the right.

Then when the third word (b30, b31, b32, b33) is read, the data shift section 32 merges the third word after shifting two-bytes to the right according to the shift amount with data (b22, b23) remaining in the data shift section 32, then writes the merged-data to the entry 0×8 of the buffer for burst-transfer 33. Data (b32, b33) which was not stored in the buffer for burst-transfer 33 out of the third word remains in the data shift section 32 at a location after shifting two-bytes to the right.

At this point data in the entries 0×4 and 0×8 of the buffer for burst-transfer are enabled, so this two-word data is two-word burst-written to the transfer destination bus. Data (b32, b33) which was not burst-written out of the third word is partial-written to the transfer destination bus.

Now the case when the third DMA command is received will be described. The data shift section 32 burst-reads the two-word data (c20-c33) from the transfer source bus. When the first word (c20, c21, c22, c23) is read, the data shift section 32 partial-writes only specific two-byte data (c22, c23) specified out of the first word after shifting zero-bytes to the transfer destination bus according to an instruction of the main controller.

Then when the second word (c30, c31, c32, c33) is read, the data shift section 32 writes the second word after shifting zero-bytes to the transfer destination bus according to an instruction of the main controller.

As described above, the DMC according to the present invention can increase the utilization efficiency of the bus by actively using burst-transfer compared with a conventional DMAC.

In the case of the present embodiment, which comprises the boundary data buffer 34 and the buffer for burst-transfer 33, the coexistence of a single transmission mode transfer between the chain mode transfer is allowed. However in the special case when the initiator of the DMAC 1 is singular and single transmission mode transfer does not coexist between chain mode transfer, the boundary data can be held in the buffer for burst-transfer 33 as is. In this case the boundary data buffer 34 is unnecessary.

Now the operation in the case of the transfer destination is a cache-controlled memory and burst-transfer is performed with the burst-transfer size matching the boundary of the cache line will be described. Hereafter the cache-controlled memory, which is the transfer destination, is called the "transfer destination memory". The cache control of the transfer destination memory is performed by an external cache control section, which is not shown in the drawings.

FIG. 6 is a diagram depicting an example of the burst-transfer operation with the burst-transfer size matching the boundary of the cache line. In the present embodiment, when the DMAC writes data to the transfer destination memory using a DMA transfer, it is assumed that the external cache control section performs only a simple control Invalidate, which invalidates the cache status of the written portion, so as to simply description here. Operation up to storing data in the buffer for burst-transfer is the same as the above mentioned operation, so here only the burst-transfer operation of the data stored in the buffer for burst-transfer will be described in detail.

Figures 6A, 6B:
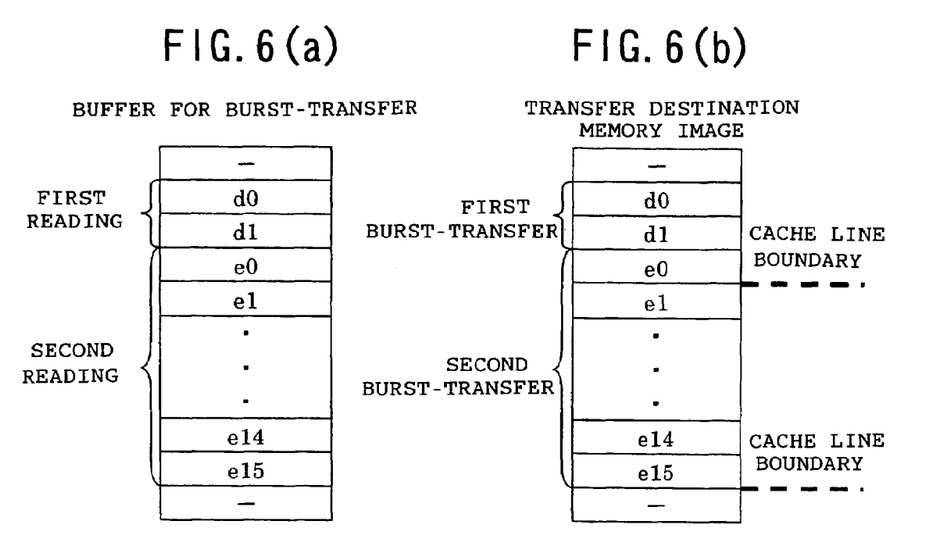

FIG. 6(a) is a diagram depicting the data array of the buffer for burst-transfer. In FIG. 6(a), the data read by two DMA commands is stored in the buffer for burst-transfer. d0 and d1 indicates the data row stored in the buffer for burst-transfer by the first DMA command, and e0-e15 indicate the data row stored in the buffer for burst-transfer by the second DMA command.

Figure 6C:
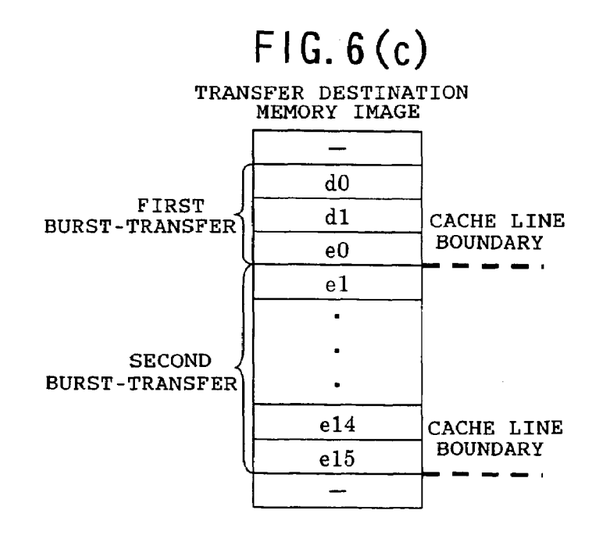

FIG. 6(b) is a diagram depicting a conventional data array of a transfer destination memory, where the data was burst-transferred regardless the cache line boundary. FIG. 6(c) is a diagram depicting the data array of the transfer destination memory when the data was burst-transferred according to the cache line boundary. In FIG. 6(b)-FIG. 6(c), dotted lines show the cache line boundary.

As FIG. 6(b) shows, if the burst-transfer is performed regardless the cache line boundary of the transfer destination memory, the data at the second burst-transfer crosses over the cache boundary, so the cache control section of the transfer destination memory performs invalidate twice in the first cache line entry, and performs invalidate once at the next cache line entry, performing invalidate a total of three times.

In the present invention, the accumulator 23 calculates the burst-transfer size matching the boundary of the cache lines of the transfer destination memory, the main controller 22 controls the bus cycle control section 31 according to the calculated burst-transfer size, and the bus cycle control section 31 burst-transfers the data stored in the buffer for burst-transfer to the transfer destination. As FIG. 6 (c) shows, if the burst-transfer is performed according to the cache line boundary of the transfer destination memory, the cache control section of the transfer destination memory performs Invalidate twice in total, once each for the two cache line entries.

In this way the DMAC according to the present embodiment can decrease the load of the cache control section outside the DMAC when the transfer destination memory is cache-controlled by performing burst-control according to the cache line boundary of the transfer destination memory. Now the configuration of the DMAC in the case when a plurality of CPUs 4, that is the initiator of DMAC 1, exist or the case when the CPU 4 operates by multi-threading, will be described. In this case, the DMAC comprises the boundary data buffer for storing a same number of sets of boundary data and the transfer destination address offset of the next data segment as the number of initiators of the DMAC 1, instead of the boundary data buffer 34 in FIG. 1, and comprises the accumulator for calculating the shift amount of the data based on the transfer source address offset and the transfer destination address offset for each instructed initiator, instead of the actuator 23, so as to implement the DMAC where a plurality of initiators exist.

As described above, the DMAC according to the present invention can support a DMA transfer instructed by a plurality of initiators.

Embodiment 2

In the present invention, the operation of the DMAC when the transfer source bus and the transfer destination bus in a DMA transfer are physically different buses of which the bus widths are different will be described. Here it is assumed that a DMA transfer is performed in the chain mode. FIG. 7 is a block diagram depicting an example of a configuration of the DMAC according to Embodiment 2. DMAC 11, CPU 15, I/O 16 and memory 17 are connected via bus A 18 which has a two-byte or more bus width. DMAC 11, I/O 19 and memory 20 are connected via bus B 21 which has a bus width that is an integral multiple of the bus width of bus A 18. In this case, the CPU 15 is an initiator of DMAC 11, and I/O 16, memory 17, I/O 19 and memory 20 are the DMA transfer targets that can be a transfer source or a transfer destination in the DMA transfer.

As FIG. 7 shows, the DMAC 11 according to the present embodiment comprises a DMA core 12, an A to B data transfer section 13 and a B to A data transfer section 14. The DMA core 12 is comprised of a command decoder 121, main controller 122 and accumulator 123. The A to B data transfer section 13 is comprised of a bus cycle control section 131, data shift section 132, buffer for burst-transfer 133, boundary data buffer 134 and data reconstruction section 135. In the same way, the B to A data transfer section 14 is comprised of a bus cycle control section 141, data shift section 142, buffer for burst-transfer 143, boundary data buffer 144 and data reconstruction section 145.

Now an operation of the DMAC 11 according to the present embodiment will be described. Here the case when the DMA transfer target connected to one bus is the transfer source and the DMA transfer target connected to the other bus is the transfer destination, in other words, the case when the bus width of the transfer source and the bus width of the transfer destination are different will be described.

As a first example, the case when the bus width of the transfer destination is an integral multiple of the bus width of the transfer source, in other words, the case when the transfer source is the I/O 16 or the memory 17, and the transfer destination is the I/O 19 or the memory 20 will be described. The DMA command transmitted from the CPU 15 is received by the bus cycle control section 131 via the bus A 18, and is input to the command decoder 121. Then the command decoder 121 interprets the DMA command and outputs the instruction on the DMA transfer which is acquired as the result of the interpretation to the main controller 122. The main controller 122 provides the transfer source address offset and the transfer destination address offset to the accumulator 123. The accumulator 123 calculates the shift amount to be provided to the data shift section 132 based on the transfer source address offset and the transfer destination address offset, and outputs it to the main controller 122.

If the chain flag exists here, the main controller 122 reads the address offset stored in the boundary data buffer, and provides it to the accumulator 123 as the transfer destination address offset. The boundary data buffer 134 stores the boundary data, which is a remaining data after dividing the previous data segment in the bus width units and is data less than the bus width, and the transfer destination address offset which is generated by the boundary data.

Then the main controller 122 instructs the bus cycle control section 131 to read the data from the transfer source. The bus cycle control section 131 reads the data from the transfer source, and outputs it to the data shift section 132. The data shift section 132 performs the same operation as Embodiment 1, and outputs the data after shifting and merging with the boundary data to the data reconstruction section 135. The data reconstruction section 135 combines the data with the bus width of the bus A 18 which was input, so as to match the bus width of the bus B 21, and outputs it to the buffer for burst-transfer 133. For example, if the bus width of the bus B 21 is n times the bus width of the bus A 18, then the data reconstruction section 135 combines n number of data which was input, and outputs it to the buffer for burst-transfer 133. The buffer for burst-transfer 133 stores the data in the units of the bus width of the bus B 21.

Figure 8:
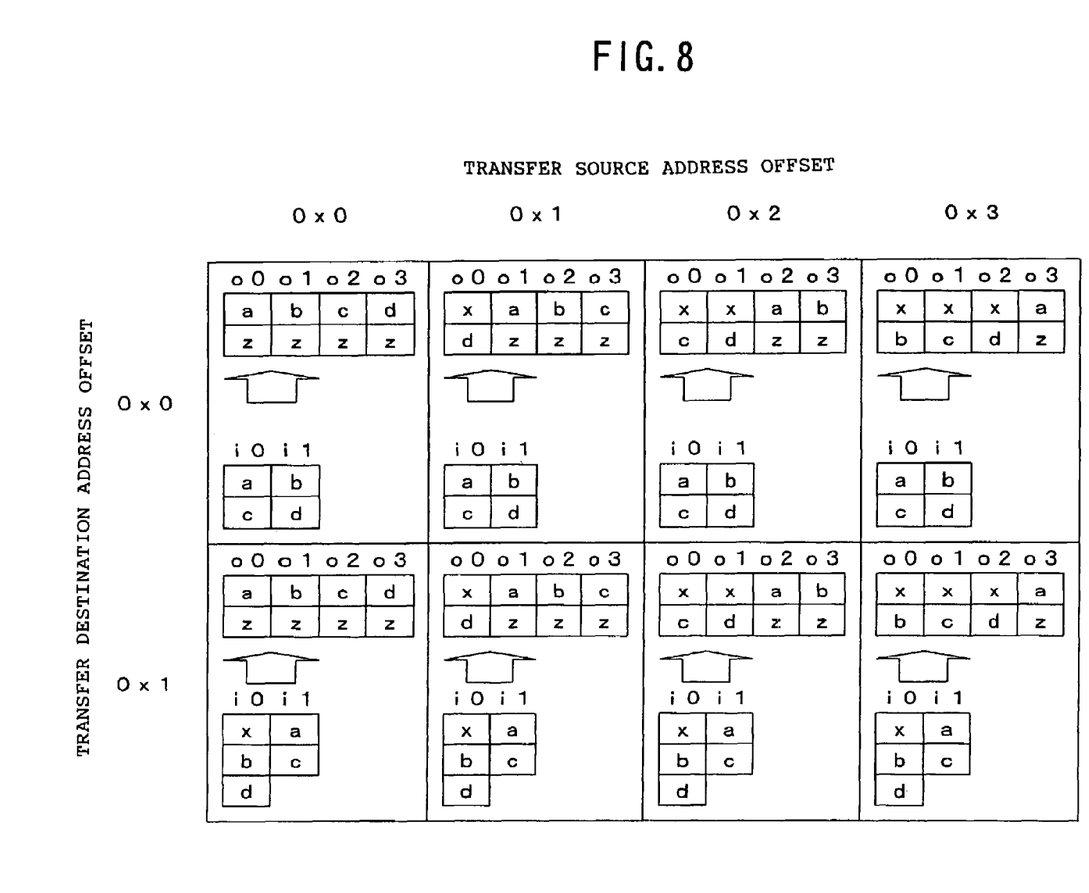
FIG. 8 is a diagram depicting an example of input/output data of the data shift section when the bus width of the transfer source is two-bytes and the bus width of the transfer destination is four-bytes.

Now the operation of the data shift section 132 and the boundary data buffer 134 will be described using specific examples. FIG. 8 is a diagram depicting an example of the input/output data of the data shift section when the bus width of the transfer source is two-bytes and the bus width of the transfer destination is four-bytes. In FIG. 8, just like FIG. 4, the numeric value written above the column indicates the transfer source address offset for the case shown in the corresponding column, and the numeric value written to the left of the row indicates the transfer destination address offset for the case shown in the corresponding row. One cell in FIG. 8 indicates a case of having a transfer source address offset that corresponds to a column and a transfer destination address offset that corresponds to a row, and the content of a cell is indicated by the input data i0 and i1 and the output data o0, o1, o2 and o3 in each case. x is a data read from the transfer source by the previous DMA command in the chain mode, and a, b, c and d are data to be read from the transfer source by the current DMA command in the chain mode, and if the chain continues, z is the next data to be read from the transfer source by the next DMA command in the chain mode, and if the chain does not continue, z does not exist. Just like FIG. 4, the two-byte input data i0 and i1 are shifted by the data shift section 132, are merged with the boundary data if necessary,. combined by the data reconstruction section 135, then is output to the buffer for burst-control 133 as four-byte output data o0, o1, 02 and o3.

The bus cycle control section 141 burst-transfers the data stored in the buffer for burst-control 133 via the bus B21 so as to write the data to the transfer destination.

Now the case when the bus width of the transfer source is an integral multiple of the bus width of the transfer destination, in other words, the case when the transfer source is the I/O 19 or the memory 20 and the transfer destination is the I/O 16 or the memory 17, will be described as the second example. The DMA command transmitted from the CPU 15 is received by the bus cycle control section 131 via the bus A 18, and is input to the command decoder 121. Then the command decoder 121 interprets the DMA command, and outputs the instruction on the DMA transfer which is acquired as the result of the interpretation to the main controller 122. Then the main controller 122 provides the transfer source address offset and the transfer destination address offset to the accumulator 123. The accumulator 123 calculates the shift amount to be provided to the data shift section 142 based on the transfer source address offset and the transfer destination address offset, and outputs it to the main controller 122.

If the chain flag exists here, the main controller 122 reads the address offset stored in the boundary data buffer, and provides it to the accumulator 123 as the transfer destination address offset. The boundary data buffer 144 stores the boundary data, which is a remaining data after dividing the previous data segment in the bus width units and is data less than the bus width, and the transfer destination address offset which is generated by the boundary data.

Then the main controller 122 instructs the bus cycle control section 141 to read the data from the transfer source. The bus cycle control section 141 reads the data from the transfer source, and outputs it to the data shift section 142 according to the instruction from the main controller 122. The data shift section 142 performs the same operation as Embodiment 1, and outputs the data after shifting and merging with the boundary data to the data reconstruction section 145. The data reconstruction section 145 divides the data with the bus width of the bus B 21 which was input, so as to match the bus width of the bus A 18, and outputs it to the buffer for burst-transfer 143. For example, if the bus width of the bus B 21 is n times the bus width of the bus A 18, then the data reconstruction section 145 divides the input data equally into n number of data, and output them to the buffer for burst-transfer 143. The buffer for burst-transfer 143 stores the data in the units of the bus width of the bus A 18.

Figure 9:
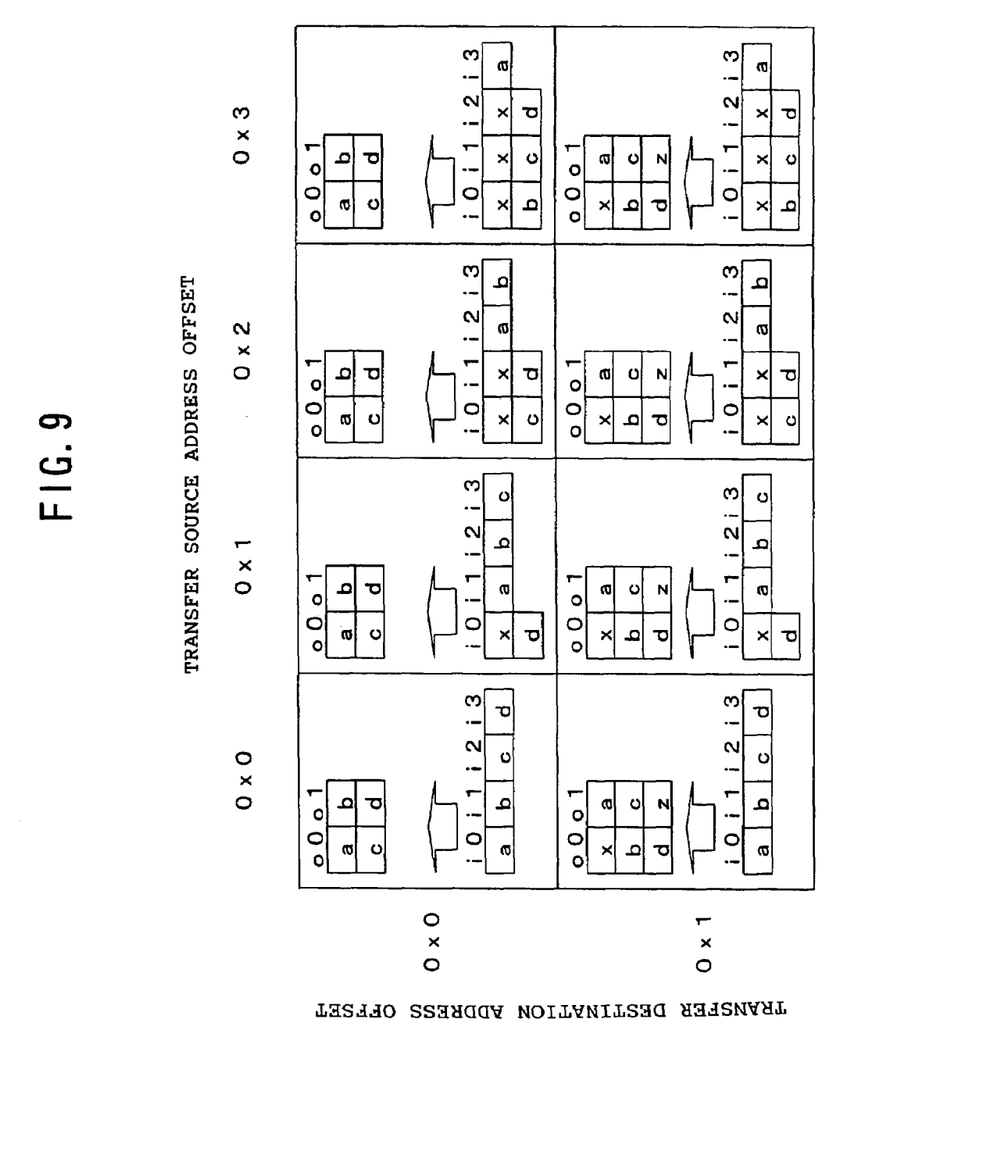
FIG. 9 is a diagram depicting an example of input/output data of the data shift section when the bus width of the transfer source is two-bytes and the bus width of the transfer destination is four-bytes.

Now the operation of the data shift section 142 and the boundary data buffer 143 will be described using specific examples. FIG. 9 is a diagram depicting an example of the input/output data of the data shift section when the bus width of the transfer source is two-bytes and the bus width of the transfer destination is four-bytes. In FIG. 9, just like FIG. 8, one cell indicates a case of having a transfer source address offset that corresponds to a column and a transfer destination address offset that corresponds to a row, and the content of the cell is indicated by the input data i0, i1, i3 and i4 and the output data o0 and o1. Also just like FIG. 8, x is a data read from the transfer source by the previous DMA command in the chain mode, and a, b, c and d are data to be read from the transfer source by the current DMA command in the chain mode, and if the chain continues, z is the next data to be read from the transfer source by the next DMA command in the chain mode, and if the chain does not continue, z does not exist. Just like FIG. 4, the four-byte input data i0, i1, i3 and i4 are shifted by the data shift section 142, are merged with the boundary data if necessary, then divided by the data reconstruction section 145, and output to the buffer for burst-transfer 143 as two-byte output data o0 and o1.

The bus cycle control section 131 burst-transfers the data stored in the buffer for burst-transfer 143 to the transfer destination via the bus A 18, so as to write the data to the transfer destination.

As described above, the utilization efficiency of the bus can be increased in the DMAC according to the present embodiment by reassembling the data so as to perform burst-transfer as much as possible when the data segments divided at an arbitrary address boundary in byte-units are DMA-transferred to the transfer destination having a different bus width from the transfer source in the chain mode.

In the present embodiment as well, when the transfer destination memory is cache-controlled, the burst-transfer matching the cache line boundary, described in Embodiment 1, can be applied. In the present embodiment, if a plurality of CPUs, that is the initiators of the DMAC 11, exist, or if the CPU operates by multi-threading, the DMAC can comprise the boundary data buffer for storing a same number of sets of the boundary data and the transfer destination address offset of the next data segment as the number of initiators, instead of the boundary data buffers 134 and 144 respectively, and comprise the accumulator for calculating the shift amount of the data based on the transfer source address offset and the transfer destination address offset for each instructed initiator, instead of the accumulator 123, so as to implement a DMAC where a plurality of initiators exist.

INDUSTRIAL APPLICABILITY

As described above, according to the present invention, the utilization efficiency of the bus can be increased by reassembling the data so as to perform burst-transfer as much as possible when the data segments divided at an arbitrary address boundary in byte-units are DMA-transferred in the chain mode. When the transfer destination memory is cache-controlled, the load of the cache control section outside the DMAC can be decreased by performing burst-transfer according to the cache line boundary of the transfer destination memory. As a result, when the data segments divided at an arbitrary byte address are DMA-transferred in the chain mode, the number of times of a data transfer can be decreased, and the overall transfer time can be decreased.

The invention claimed is:

1. A DMA controller that accesses a transfer source and a transfer destination of a DMA transfer via a bus, chaining a plurality of data segments in the transfer source according to an instruction by an external initiator, and performing burst-transfer to the transfer destination, comprising:
   a bus read section that reads the data segments of the transfer source as a first data;
   a buffer for burst-transfer that stores the data in the bus width units;
   a boundary data buffer that stores the boundary data and the transfer destination address offset of the next data segment when a boundary data, that is a remaining data after dividing in the bus width units and is data less than the bus width, is generated;
   an accumulator that calculates a shift amount of said first data based on a transfer source address offset acquired by an instruction of said initiator and a transfer destination address offset stored in said boundary data buffer;
   a data shift section that shifts said first data according to said shift amount, merges the boundary data generated in the previous data segment and said shifted first data to generate a second data, and outputs said boundary data and the transfer destination address offset of the next data segment to said boundary data buffer and outputs the data before said boundary data out of said second data to said buffer for burst-transfer when the boundary data is generated in said second data and the next data segment is chained; and
   a bus write section that burst-transfers the data stored in said buffer for burst-transfer to the transfer destination.

2. The DMA controller according to claim 1, characterized in that said data shift section outputs said second data to said buffer for burst-transfer except for said case when the boundary data is generated in said second data and the next data segment is chained.

3. The DMA controller according to claim 1, characterized in that when the transfer destination is cache-controlled, said accumulator calculates a burst-transfer size matching the boundary of the cache line, and said bus write section burst-transfers data stored in said buffer for burst-transfer to the transfer destination according to said burst-transfer size.

4. The DMA controller according to claim 1, characterized in that when there are a plurality of said external initiators, said boundary data buffer stores a same number of sets of the boundary data and the transfer destination address offset of the next data segment as the number of said initiators, and said accumulator calculates the data shift amount based on said transfer source address offset and transfer destination address offset for each instructed initiator.

5. A DMA controller that accesses a transfer source and transfer destination of a DMA transfer connected to a plurality of buses with different widths, that chains a plurality of data segments in the transfer source according to an external initiator, and that performs burst-transfer to the transfer destination, comprising:
   a bus read section that reads the data segments of the transfer source as a first data;
   a buffer for burst-transfer that stores the data in the transfer destination bus width units;
   a boundary data buffer that stores the boundary data and the transfer destination address offset of the next data segment when a boundary data, that is a remaining data after dividing in the transfer source bus width units and is data less than the transfer source bus width, is generated;
   an accumulator that calculates a shift amount of said first data based on a transfer source address offset acquired by an instruction of said initiator and a transfer destination address offset stored in said boundary data buffer;
   a data reconstruction section that rearranges the data in the transfer source bus width units into the data in the transfer destination bus width units, and outputs the data to said buffer for burst-transfer;
   a data shift section that shifts said first data according to said shift amount, merges the boundary data generated in the previous data segment and said shifted first data to generate a second data, and outputs said boundary data and the transfer destination address offset of the next data segment to said boundary data buffer and outputs the data before said boundary data out of said second data to said data reconstruction section when the boundary data is generated in said second data and the next data segment is chained; and
   a bus write section that burst-transfers the data stored in said buffer for burst-transfer to the transfer destination.

6. The DMA controller according to claim 5, characterized in that said data shift section outputs said second data to said reconstruction section except for said case when the boundary data is generated in said second data and the next data segment is chained.

7. The DMA controller according to claim 5, characterized in that when the transfer destination bus width is an integral multiple of the transfer source bus width, the data reconstruction section combines the data output from the data shift section and outputs the data to said buffer for burst-transfer, and when the transfer source bus width is an integral multiple of the transfer destination bus width, the data reconstruction section divides the data output from the data shift section and outputs the data to said buffer for burst-transfer.

8. The DMA controller according to claim 7, characterized in that when the transfer destination is cache-controlled, said accumulator calculates a burst-transfer size matching the boundary of the cache line, and said bus write section burst-transfers the data stored in said buffer for burst-transfer to the transfer destination according to said burst-transfer size.

9. The DMA controller according to claim 7, characterized in that when there are a plurality of said external initiators, said boundary data buffer stores a same number of sets of boundary data and the transfer destination address offset of the next data segment as the number of said initiators, and said accumulator calculates the shift amount of the data segment based on said transfer source address offset and transfer destination address offset for each instructed initiator.

10. A DMA control method that accesses a transfer source and a transfer destination of a DMA transfer via a bus, that chains a plurality of data segments in the transfer source according to an instruction by an external initiator, and that performs burst-transfer to the transfer destination, comprising:

reading the data segments of the transfer source as a first data;

calculating a shift amount of said first data based on a transfer source address offset acquired by an instruction of said initiator and a transfer destination address offset in the case when a boundary data, that is a remaining data after dividing the previous data segment in the bus width units and is data less than the bus width, is generated;

shifting said first data according to said shift amount, merges the boundary data generated in the previous data segment and said shifted first data to generate a second data, and storing said boundary data and the transfer destination address offset of the next data segment and storing the data before said boundary data out of said second data as data for burst-transfer when the boundary data is generated in said second data and the next data segment is chained; and burst-transferring said data for burst-transfer to the transfer destination.

11. The DMA control method according to claim 10, further comprising storing said second data segment as the data for burst-transfer except for said case when the boundary data is generated in said second data and the next data segment is chained.

12. A DMA control method that accesses a transfer source and transfer destination of a DMA transfer connected to a plurality of buses with different widths, that chains a plurality of data segments in the transfer source according to an external initiator, and that performs burst-transfer to the transfer destination, comprising:

reading the data segments of the transfer source as a first data;

calculating a shift amount of said first data based on a transfer source address offset acquired by an instruction of said initiator and a transfer destination address offset in the case when a boundary data, that is a remaining data after dividing the previous data segment in the transfer source bus width units and is data less than the transfer source bus width, is generated;

shifting said first data according to said shift amount, merges the boundary data generated in the previous data segment and said shifted first data to generate a second data, and storing said boundary data and the transfer destination address offset of the next data segment and rearranging the data before said boundary data out of said second data into the data in the transfer destination bus width units and storing the data as the data for burst-transfer when the boundary data is generated in said second data and the next data segment is chained; and burst-transferring said data for burst-transfer to the transfer destination.

13. The DMA control method according to claim 12, further comprising rearranging said second data into the data in the transfer destination bus width units and storing the data as the data for burst-transfer except for said case when the boundary data is generated in said second data and the next data segment is chained.

14. A DMA control program stored in a medium readable by a computer for the computer to execute the operation of accessing a transfer source and a transfer destination of a DMA transfer via a bus, that chains a plurality of data segments in the transfer source according to an instruction by an external initiator, and that performs burst-transfer to the transfer destination, the program causing the computer to execute:

reading the data segments of the transfer source as a first data;

calculating a shift amount of said first data based on a transfer source address offset acquired by an instruction of said initiator and a transfer destination address offset in the case when a boundary data, that is a remaining data after dividing the previous data segment in the bus width units and is data less than the bus width, is generated;

shifting said first data according to said shift amount, merges the boundary data generated in the previous data segment and said shifted first data to generate a second data, and storing said boundary data and the transfer destination address offset of the next data segment and storing the data before said boundary data out of said second data as data for burst-transfer when the boundary data is generated in said second data and the next data segment is chained; and burst-transferring said data for burst-transfer to the transfer destination.

15. The DMA control program according to claim 14, further causing the computer to execute storing said second data in said buffer for burst-transfer except for said case when the boundary data is generated in said second data and the next data segment is chained.

16. A DMA control program stored in a medium readable by a computer for the computer to execute the operation of accessing a transfer source and a transfer destination of a DMA transfer connected to a plurality of buses with different widths, that chains a plurality of data segments in the transfer source according to an external initiator, and performs burst-transfer to the transfer destination, the program causing the computer to execute:

reading the data segments of the transfer source as a first data;

calculating a shift amount of the first data based on a transfer source address offset acquired by an instruction of said initiator and a transfer destination address offset in the case when a boundary data, that is a remaining data after dividing the previous data segment in the transfer source bus width units and is data less than the transfer source bus width, is generated;

shifting said first data according to said shift amount, merges the boundary data generated in the previous data segment and said shifted first data to generate a second data, and storing said boundary data and the transfer destination address offset of the next data segment, and rearranging the data before said boundary data out of said second data into the data in the transfer destination bus width units and storing the data as the data for burst-transfer when the boundary data is generated in said second data and the next data segment is chained; and burst-transferring said data for burst-transfer to the transfer destination.

17. The DMA control program according to claim 16, further causing the computer to execute rearranging said second data into data in the transfer destination bus width units and storing the data as the data for burst-transfer except for said case when the boundary data is generated in said second data and the next data segment is chained.

* * * * *